United States Patent
Foltzer et al.

(10) Patent No.: US 6,775,431 B1
(45) Date of Patent: Aug. 10, 2004

(54) V GROOVE OPTIC SWITCH

(75) Inventors: Lawrence E. Foltzer, Occidental, CA (US); Stephen S. Greer, Santa Rosa, CA (US); Josef T. Hoog, Novato, CA (US); Van Odell, Novato, CA (US)

(73) Assignee: Turin Networks, Petaluma, CA (US)

( * ) Notice: Subject to any disclaimer, the term of this patent is extended or adjusted under 35 U.S.C. 154(b) by 0 days.

(21) Appl. No.: 09/838,085

(22) Filed: Apr. 18, 2001

(51) Int. Cl.[7] .............................. G02B 6/26; G02B 6/42
(52) U.S. Cl. ........................................ 385/20; 385/16
(58) Field of Search .............................. 385/16, 17, 20, 385/25, 52, 63–65, 82, 83, 22; 356/452

(56) References Cited

U.S. PATENT DOCUMENTS

| | | | | |
|---|---|---|---|---|
| 4,426,155 A | * | 1/1984 | Monchalin ................... 356/452 |
| 5,185,825 A | * | 2/1993 | Shigematsu et al. .......... 385/20 |
| 5,896,197 A | * | 4/1999 | Coffin ........................ 356/452 |
| 5,920,665 A | * | 7/1999 | Presby ........................ 385/16 |
| 5,943,456 A | * | 8/1999 | Buchholz et al. ............. 385/24 |
| 5,982,972 A | * | 11/1999 | Tucker et al. ................ 385/135 |
| 6,049,641 A | * | 4/2000 | Deacon et al. ................ 385/15 |
| 6,108,467 A | * | 8/2000 | Naraoka et al. .............. 385/20 |
| 6,421,153 B1 | * | 7/2002 | Way et al. ................... 359/156 |
| 2001/0041026 A1 | * | 11/2001 | Steinberg et al. ............. 385/20 |
| 2002/0025107 A1 | * | 2/2002 | Heiks et al. ................. 385/20 |

* cited by examiner

*Primary Examiner*—Edward J. Glick
*Assistant Examiner*—Thomas R Artman
(74) *Attorney, Agent, or Firm*—Blakely, Sokoloff, Taylor & Zafman LLP

(57) ABSTRACT

An apparatus comprising a first plate having a plurality of v-shaped grooves to hold a set of optical fibers and a second plate having a v-shaped groove to hold a secondary optical fiber is disclosed. In one embodiment, the second plate being movable relative to the first plate, so that the secondary optical fiber can be selectively coupled to one of the optical fibers of the first set of optical fibers.

17 Claims, 6 Drawing Sheets

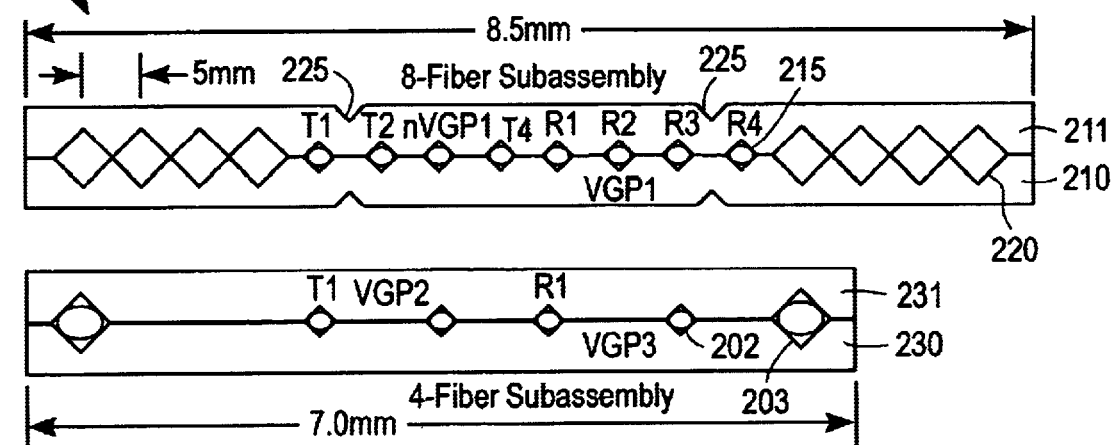
FIG. 2a
FIG. 2d
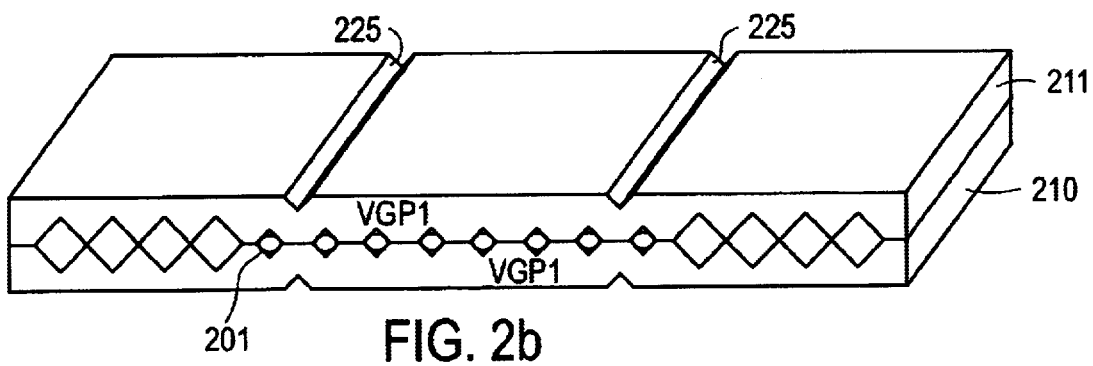
FIG. 2b
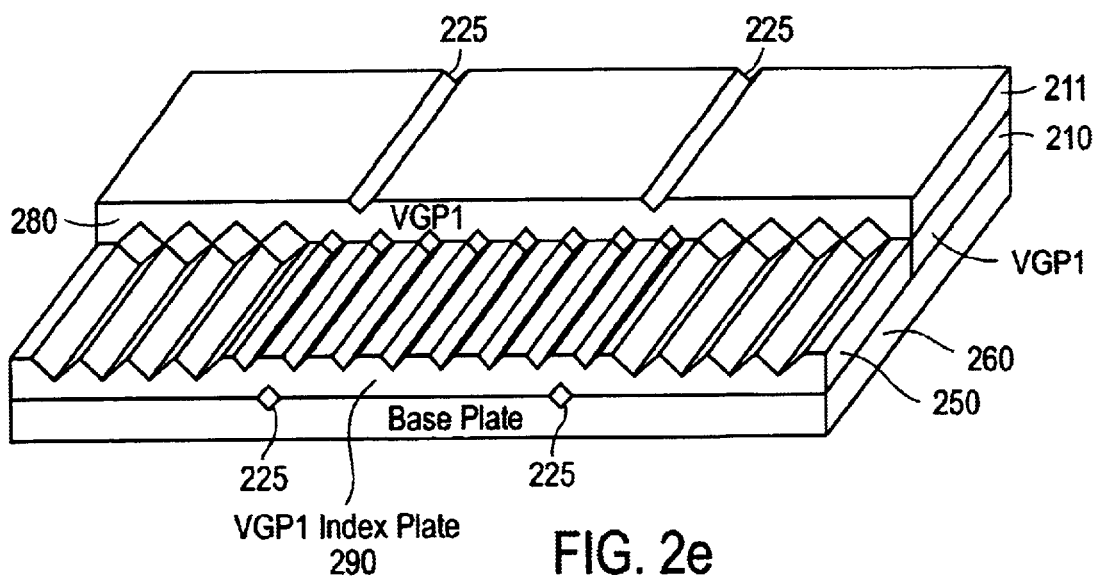
FIG. 2e

V GROOVE OPTIC SWITCH

FIELD OF THE INVENTION

The invention is related to the field of optical switches; more particularly, the present invention relates to a V groove optical switch that may be used in, for example, optical networks.

BACKGROUND OF THE INVENTION

Conventional optical networks route optical signals through optical fibers and switches so that people or computers can communicate with each other through the network. However, if an optical fiber breaks, or if a switch malfunctions, the link between a node connected to the broken fiber or malfunctioning switch and the rest of the network will be severed. Thus, a broken fiber can render the network inaccessible for the person or computer connected to the broken fiber.

SUMMARY OF THE INVENTION

An apparatus comprising a first plate having a plurality of v-shaped grooves to hold a set of optical fibers and a second plate having a v-shaped groove to hold a secondary optical fiber is disclosed. In one embodiment, the second plate being movable relative to the first plate, so that the secondary optical fiber can be selectively coupled to one of the optical fibers of the first set of optical fibers.

BRIEF DESCRIPTION OF THE DRAWINGS

The present invention is illustrated by way of example and not limitation in the figures of the accompanying drawings, in which like references indicate similar elements, and in which:

FIGS. 2a, 2b, 2c, 2d and 2e show an example of components of a silicon V groove optical switch.

DETAILED DESCRIPTION

A V groove (v-shaped) optical switch is disclosed. In one embodiment, the V groove optical switch connects a line card to a secondary optical fiber if there is a signal loss over the primary optical fiber, thus providing a redundant feed between the line card and a working node. The V groove switch may be periodically tested to verify the satisfactory operation of the switch.

In one embodiment, the V-shaped groove optical switch comprises a pair of silicon plates. The plates can be constructed of many materials other than the silicon that are traditionally used in the manufacture of the optic arrays. The materials include quartz, sapphire, borosilicate glass, zirconia, metals, metallic alloys, metallic compounds and plastics. In another embodiment, the switch contains a combination of silicon and borosilicate glass plates.

Machine tools directly machine or model the V groove or other shaped plates. Note that shapes other than, or similar to, V grooves may be used in alternate embodiments.

Figure 1:
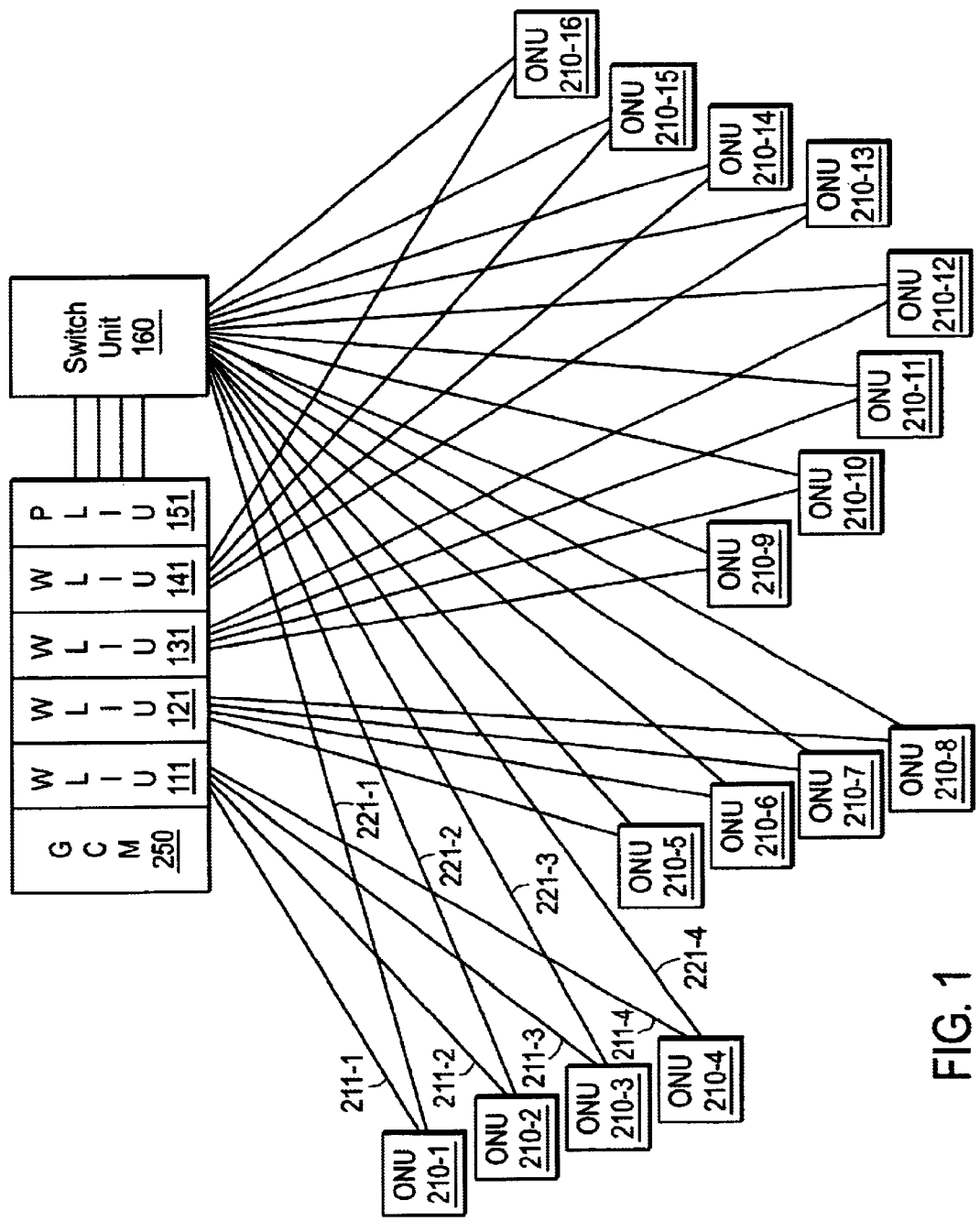
FIG. 1 shows an example of an optical network that uses the optical interface port.

FIG. 1 shows an example of an optical network that uses the optical interface port. As shown in FIG. 1, each channel of a given line card is connected to a given optical network unit 210-$i$ through an optical fiber 211-$j$, 212-$j$, 213-$j$ and 214-$j$ connected to the corresponding working line interface unit. A redundant optical fiber 221-$j$, 222-$j$, 223-$j$ and 224-$j$ for each channel is connected to optical switch unit 160, which in one embodiment contains form switches. The redundant optical fiber connections for each channel 1 are connected to one of the V groove switches in switch unit 160. Similarly, the redundant optical fiber connections for channels 2, 3 and 4 are connected to individual separate switches in switch unit 160.

If a connection between a line card and an optical network fails, the redundant connection can be used to maintain the feed between the line card and the corresponding optical network unit. For example, suppose the optical fiber 211-1, which connects to channel 1 of an optical line card, via line interface unit 111, to optical network unit 210-1, fails to send optical signals between the line card and unit 210-1. The loss of the signal causes gateway control module (GEM) 250 to instruct an optical switch protection controller in switch unit 160 to connect the V groove switch in switch unit 160 associated with channel 1 to channel 1 of that line card. This V groove switch can then link channel 1 of the line card to optical fiber 221-1, thereby providing a redundant connection between unit 210-1 and the line card. The same is true for other optical network units 210-2-210-16 and line interfere units 121, 131, 141 and 151. Note that a system may continue a greater or lesser number of optical network units, line interfere units and associated line cards.

The switch unit 160 may include feedback capability that enables the optical switch protection controller to determine the current position of a given switch. This enables the controller to determine the direction and the number of steps needed to move a given switch to make a desired connection.

Also, by implementing a link feedback/continuity method, the controller can be informed of the current state of a given switch by gateway control module 250. In one embodiment, a suite of periodic tests may be added to the system to verify the satisfactory operation of a switch during system operation. For example, when a switch provides a redundant feed to a working node, the performance of the redundant feed to a working node, such as an optical network unit, can be monitored. A successful feed between the node and the switch can be detected by monitoring the remote node's receiver LOS, to verify basic continuity, using an in-band signaling over a SONET line or section communications channel. A quantitative assessment of the link performance can be determined by monitoring SONET overhead bytes B1 and B2 for a finer level of granularity. The frequency of implementing the feedback method may be on the order of a normal maintenance service interval. A switch failure can thus be timely detected, before a link failure, to guarantee system robustness.

Figure 2C:
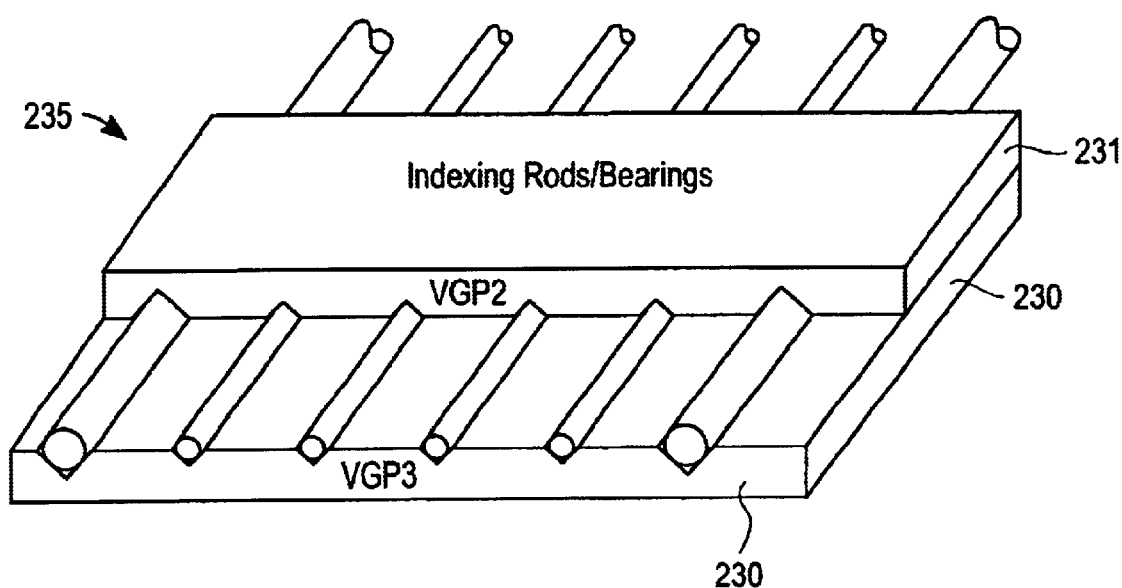

FIGS. 2a, 2b, 2c, 2d and 2e show an example of components of one embodiment of a silicon v groove optical switch. FIG. 2a shows subassembly 205 which includes two silicon v groove plates 210 and 211. Each silicon v groove plate has optical fiber eight v grooves 215 and eight bearing v grooves 220. However, other embodiments may have other numbers of fiber v grooves and bearing v grooves. The plates also have two alignment grooves 225; again, any number of alignment grooves may be included. The optical fiber v grooves of plate 210 are aligned with the corresponding optical fiber v grooves of plate 211, and are used in one embodiment to hold optical fibers 201 from a line card. In one embodiment, some of the optical fibers are for transmitting data, while others are for receiving data. FIG. 2b shows a perspective view of plates 210 and 211.

FIG. 2c shows subassembly 235 which includes plates 230 and 231 that have optical fiber v grooves 215 and bearing v grooves 220. In one embodiment, the fiber v grooves 215 are used to hold optical fibers 202 that connect a channel of a line card to a redundant optical fiber. Bearing v grooves 220 are used to hold bearing rods 203. FIG. 2d shows another view of plates 230 and 231. Plate 231 extends beyond plate 230 by a given distance 240.

FIG. 2e shows the silicon v groove subassembly 205 of FIGS. 2a and 2b coupled to an additional silicon v groove plate 250 and a base plate 260. The plates 250 and 260 have alignment grooves 225. Plate 250 and 260 are aligned when the corresponding alignment v grooves 225 to form a diamond-shaped aperture, as shown in FIG. 2e. Similarly, subassembly 205 is aligned with base plate 260 using alignment grooves 225 of plates 210 and 260.

Subassembly 235 shown in FIG. 2d is placed on top of subassembly 205 shown in FIG. 2e, so that surface 270 of plate 230 abuts surface 280 of plate 211, and surface 270 of plate 230 abuts surface 290 of plate 250. Bearing rods 203 are used to place fibers 202 in the correct position so that fibers 202 connect with appropriate fibers 201. In one embodiment, by moving fibers 202 relative to fibers 201, the silicon v groove switch can connect an appropriate channel of a line card to an appropriate redundant optical fiber.

Figure 3B:
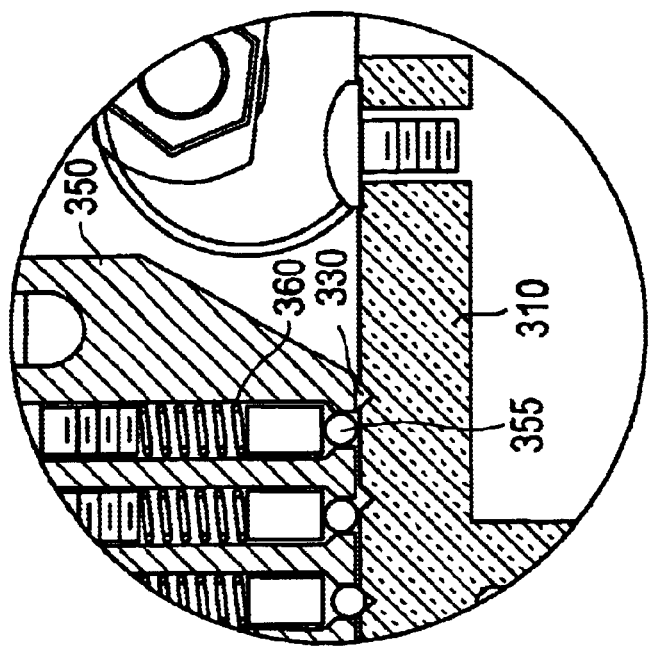
FIGS. 3a and 3b show a mechanism for moving fibers.
Figure 3A:
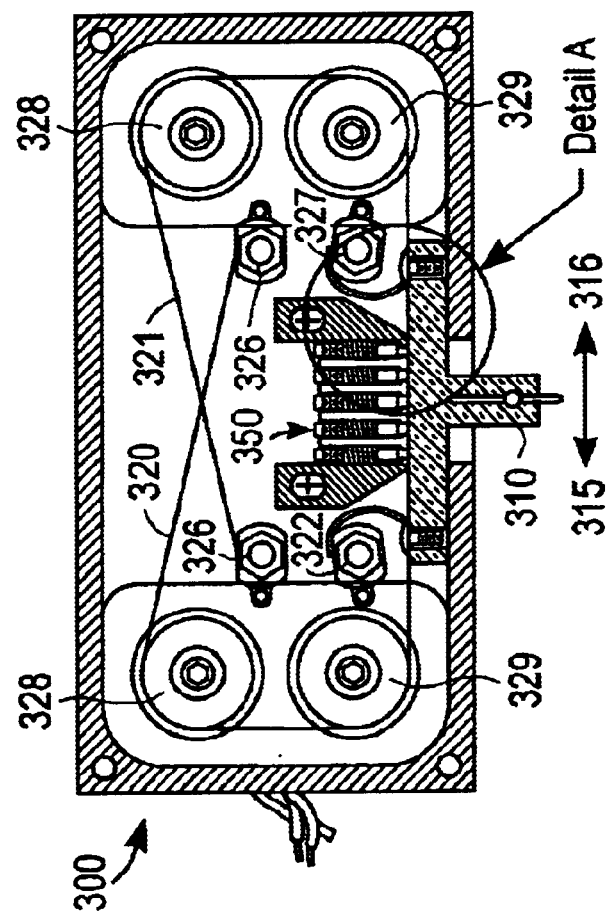

FIG. 3a shows a mechanism 300 for moving fibers 302. Block 310 is connected to subassembly 335, which contains fibers 301. Shaped memory metal lines 320 and 321 are attached to block 310. Lines 320 and 321 may be secured to mechanism 300 by holders 326 and 327. The lines may also be guided by guides 328 and 329. An electrical charge can be applied to the shaped memory metal lines 320 and 321 to expand or contract the shaped memory metal. Thus, in order to move block 310 in direction 315, an electric charge that shortens shaped memory metal is applied to line 320, and an electric charge that expands shaped memory metal is applied to line 321.

As shown in FIG. 3b, block 310 may contain alignment v grooves 330, so that the block 310 remains in a location that aligns fibers 302 with appropriate fibers 301. Device 350 contains bearings 355 that fit into grooves 330. A spring mechanism 360 is attached to each of bearings 355 so that when the lines 320 and 321 move block 310, bearings 355 rise out of the grooves to enable block 310 to move. The spring mechanism 360 places sufficient force on the bearings so that when the lines 320 and 321 are not moving the block 310, block 310 remains in a stationary position.

Figure 4A:
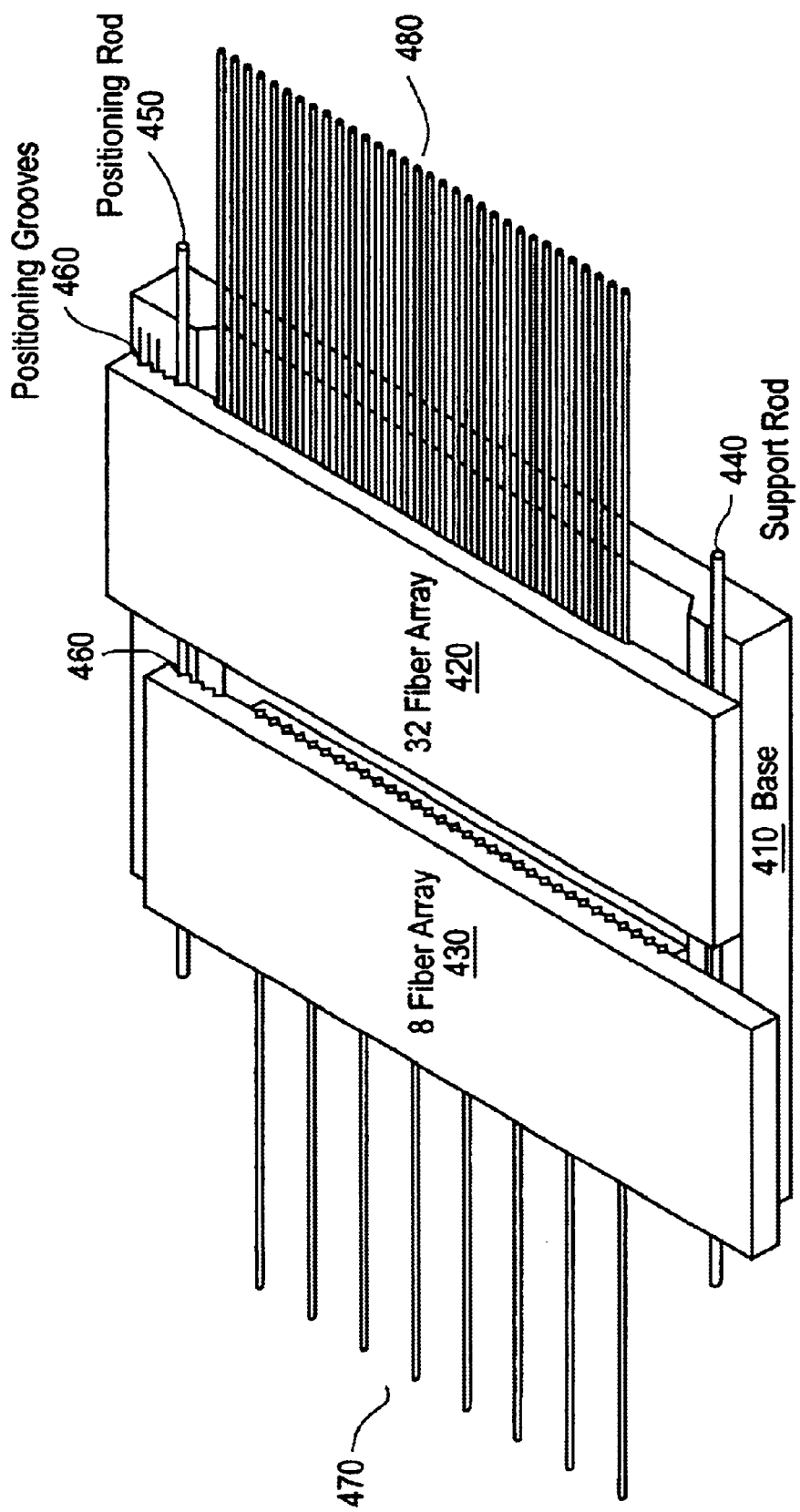
FIG. 4 shows an alternative embodiment of the silicon V groove optical switch.

FIG. 4 shows an alternative embodiment of the silicon v groove optical switch. Fiber array 430, which in one embodiment has eight fibers 470, for example, can be used to protect fiber array 420, which in one embodiment, has thirty-two fibers 480, for example. Fiber arrays 420 and 430 are supported by base 410. Base 410 may include a support groove to hold support rod 440, which supports the fiber arrays 420 and 430. The Base 410 may also include a groove to hold positioning rod 450. The fiber arrays 420 and 430 may include positioning grooves 460, which may be used to move fiber array 430 relative to fiber array 420 and base 410, using positioning rod 450 so that the proper positioning groove of fiber array 430 is located above positioning rod 450.

Due to the size, geometry, and materials of the rods and grooves, the application of the forces producing the required precise movements, of distances measured in microns, at speeds measured in milliseconds, may be crucial to reliable operation.

Figure 5:
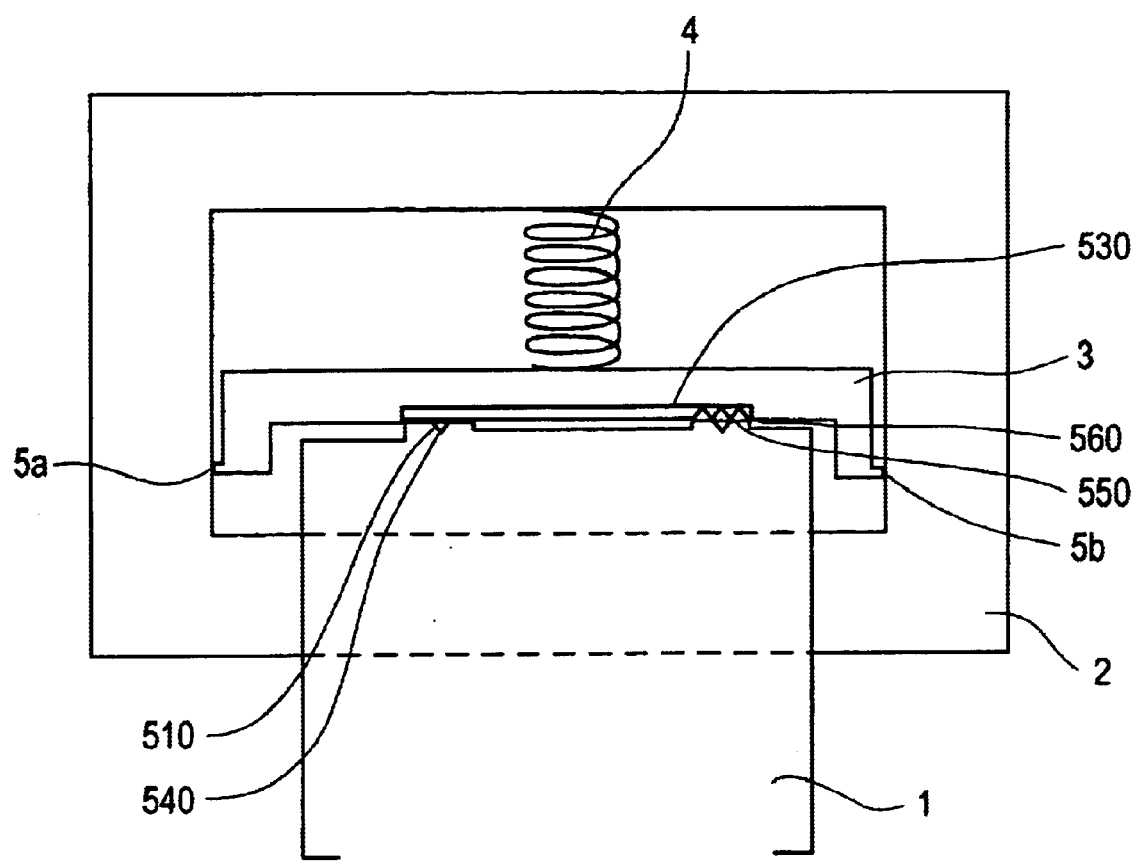
FIG. 5 illustrates one embodiment of a cradle and yoke mechanism in conjunction with an optical switch.

FIG. 5 illustrates one embodiment of a cradle and yoke mechanism in conjunction with an optical switch. Relevant components from FIG. 4 are included in FIG. 5. Platform 1 is located below base 410, which is mounted to it. Platform 1 contains a hole or opening to which the bottom of the yoke can be referenced. Yoke 2 supplies a reference to the platform 1, and therefore the base 410, and for the cradle 3 and spring 4, to provide a mounting for fiber array 430. Fiber array 430 is mounted to Cradle 3. Spring 4 provides the force necessary to ensure the proper engagement of the fiber array 430 with the support rod 440 and the positioning rod 450 in the positioning grooves 460. Movement is accomplished when a lateral force is applied the platform 1 and the yoke 2. The lateral force applied between platform 1 and yoke 2 is transmitted by the line contact of yoke 2 and cradle 3, at points 5a and 5b, depending on the lateral direction of the applied force. Points 5a and 5b lie below the plane formed by the lines of contact on support rod 440 and positioning rod 450 on fiber array 430.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. An apparatus comprising:

a base member;

a first plate having a plurality of v-shaped grooves to hold a set of optical fibers, the first plate being disposed on a surface of the base member; and a second plate having a v-shaped groove to hold a secondary optical fiber, the second plate being disposed and movable with respect to the surface of the base member, the second plate being movable relative to the first plate, to enable an optical coupling of the secondary optical fiber to one of the optical fibers of the set of optical fibers, wherein the surface of the base member includes a groove to hold a positioning rod to position the first plate and the second plate;

and wherein the second plate is movable in a direction transverse to the longitudinal axis of the positioning rod.

2. The apparatus defined in claim 1 wherein the set of optical fibers comprise optical fibers from a line card.

3. The apparatus defined in claim 1 further comprising:

a line card having a plurality of primary optical fibers;

wherein the set of optical fibers is connected to the line card, and each primary optical fiber corresponds to a fiber from the set of optical fibers.

4. The apparatus defined in claim 3, further comprising:

a control module to detect an inoperative optical fiber, and to cause the secondary optical fiber to couple with the corresponding optical fiber from the set of optical fibers.

5. The apparatus defined in claim 4, wherein the control module periodically moves the second plate relative to the first plate to test whether the first and second plates operate together to provide an optical switch.

6. The apparatus defined in claim 1 wherein the first and second plates comprise at least one material selected from a group comprising silicon, quartz, sapphire, borosilicate glass, zirconia, metal, a metallic alloy, a metallic compound, and plastic.

7. The apparatus defined in claim 1 wherein the first and second plates further comprise bearing grooves to hold bearing rods.

8. The apparatus defined in claim 1 wherein the first and second plates further comprise alignment grooves to hold alignment rods.

9. The apparatus defined in claim 1, further comprising:
a control module to detect an inoperative optical fiber, and to cause the secondary optical fiber to couple with the corresponding optical fiber from the set of optical fibers.

10. The apparatus defined in claim 7, wherein the control module periodically moves the second plate relative to the first plate to test whether the first and second plates operate together to provide an optical switch.

11. The apparatus of claim 1, wherein the second plate includes a groove to move and position the second plate relative to the base member and the first plate using the positioning rod.

12. The apparatus of claim 1, wherein the first plate includes a groove to move and position the first plate relative to the base member and the second plate using the positioning rod.

13. The apparatus of claim 1, wherein the surface of the base member further comprises a support groove to hold a support rod to allow the first and the second plates to move on the support rod.

14. An apparatus comprising:
a base member;
a first plate having a plurality of v-shaped grooves to hold a set of optical fibers, the first plate being disposed on a surface of the base member; and
a second plate having a v-shaped groove to hold a secondary optical fiber, the second plate being disposed and movable with respect to the surface of the base member, wherein the first and second plates further comprise bearing grooves to hold bearing rods;
the second plate being movable relative to the first plate, to enable coupling of the secondary optical fiber to one of the optical fibers of the set of optical fibers;
a line card having a plurality of primary optical fibers; and
wherein the set of optical fibers is connected to the line card, and each primary optical fiber corresponds to a fiber from the set of optical fibers, wherein the surface of the base member includes a groove to hold a positioning rod to position the first plate and the second plate;
and wherein the second plate is movable in a direction transverse to the longitudinal axis of the positioning rod.

15. The apparatus of claim 14, wherein the second plate includes a groove to move and position the second plate relative to the base member and the first plate using the positioning rod.

16. The apparatus of claim 14, wherein the first plate includes a groove to move and position the first plate relative to the base member and the second plate using the positioning rod.

17. The apparatus of claim 14, wherein the surface of the base member further comprises a support groove to hold a support rod to allow the first and the second plates to move on the support rod.

\* \* \* \* \*